June 25, 1929.  A. W. WOODWARD  1,718,621
RIM COLLAPSING TOOL
Filed Dec. 31, 1926

INVENTOR.
ALVA W. WOODWARD.
BY Ely & Barrow
ATTORNEYS

Patented June 25, 1929.

1,718,621

UNITED STATES PATENT OFFICE.

ALVA W. WOODWARD, OF AKRON, OHIO, ASSIGNOR TO THE FIRESTONE STEEL PRODUCTS COMPANY, OF AKRON, OHIO, A CORPORATION OF OHIO.

RIM-COLLAPSING TOOL.

Application filed December 31, 1926. Serial No. 158,174.

This invention relates to rim collapsing tools such as are used for collapsing transversely split rims for mounting pneumatic tires.

The general purpose of the invention is to provide an improved collapsing tool including a lever operable about a fixed pivot on one end of the rim and a link or bail attached to the lever and adapted to be connected to the other end of the rim, whereby the rim ends can be drawn more easily into overlapping relationship and to considerably greater extent than with prior collapsing tools and can also be easily and effectively returned to their normal or expanded positions.

The invention also has for its object the provision of the combination of the tool with a rim so equipped as to be operable by such tool. The foregoing and other objects of the invention are attained by the tool and rim construction shown in the accompanying drawings and described below. It is to be understood that the invention is not limited to the specific form thereof shown and described.

Of the accompanying drawings.

Figure 1:
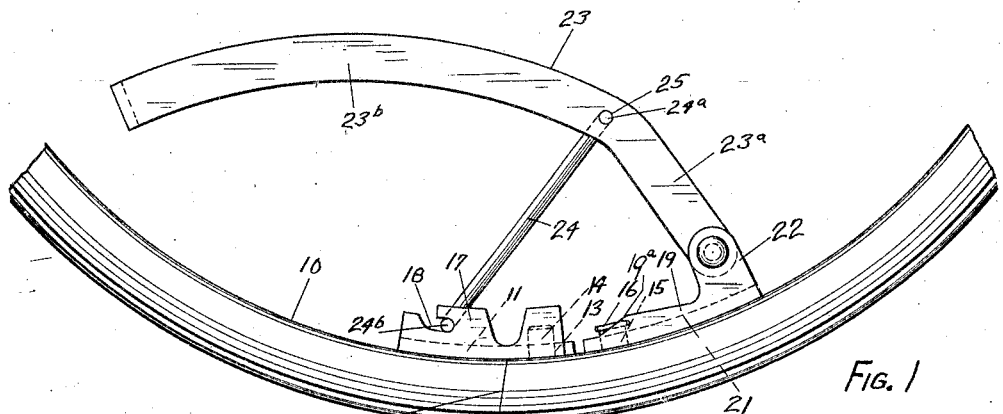
Figure 1 is a side elevation of a portion of a split rim showing the tool mounted in operation position thereon.
Figure 2:
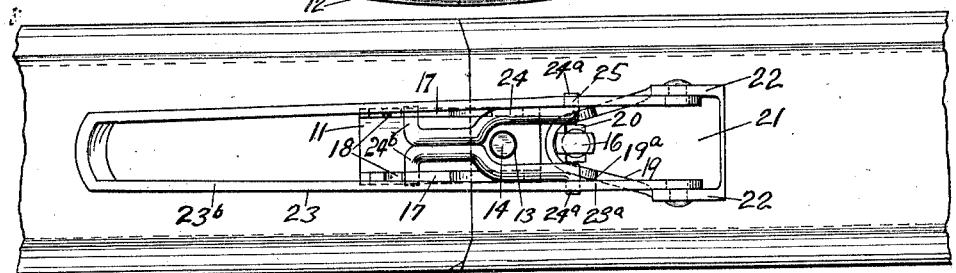
Figure 2 is a plan thereof.

Referring to the drawings, the numeral 10 designates a transversely split rim, the ends of which are adapted to be secured together by a latch plate 11 secured on one end of the rim on the inner periphery thereof and formed to extend across the split 12, said plate having an aperture 13 in its extended end adapting the plate to extend over a lug 14 on the other end of the rim to secure the rim ends together. The split 12 is preferably inclined to the radial in the direction of the collapsing movement of the ends of the rims.

To provide for a fixed pivot for the tool, to be described, on the rim 10, a stud 15 formed with a circumferentially elongated head 16 is secured on the inner periphery of rim end carrying lug 14 more remote from the split than said lug. Connection of the tool to the other end of the rim is provided for by flanges 17, 17 turned inwardly from the sides of plate 11 and having notches 18, 18 undercut therein oppositely of each other in a direction extending circumferentially toward the split 12.

The collapsing tool includes a bracket 19 provided with a transversely elongated slot 20 adapting the bracket to be passed over head 16 on stud 15 by aligning the slot 20 with said head so that by rotation of the bracket to extend circumferentially of the rim the stud will removably secure the bracket 19 thereon. The bracket 19 is formed with an arcuate base 21 adapted to bear upon the inner periphery of the rim and with inwardly turned lugs 22, 22 on opposite sides thereof apertured to provide pivots.

The tool operating lever indicated at 23 is preferably in the form of a strip of metal doubled upon itself to provide spaced members pivoted at their ends on lugs 22, a portion of the lever 23$^a$ extending substantially in a straight line from the pivots, the other portion 23$^b$ extending arcuately to lie against the inner periphery of rim 10 when the latter is fully collapsed by the tool.

A bail or link 24 is pivoted onto the lever 23 at a suitable point indicated at 25 for securing the desired leverage thereon. The bail 24 preferably has lateral extensions 24$^a$, 24$^a$ thereon on the members thereof whereby it may be pivoted on lever 23 by compressing the members together inserting them between the members of lever 23 and allowing the bail members to spring apart with the lateral extensions engaging in apertures at 25 in the lever members. To provide for engaging the free end of the bail with the slots 18 in the latch plate flanges 17, lateral extensions 24$^b$, 24$^b$ are formed thereon.

Figure 5:
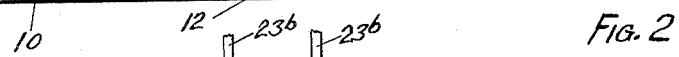
Figure 5 is a radial section therethrough on line 5—5 of Figure 3.
Figure 3:
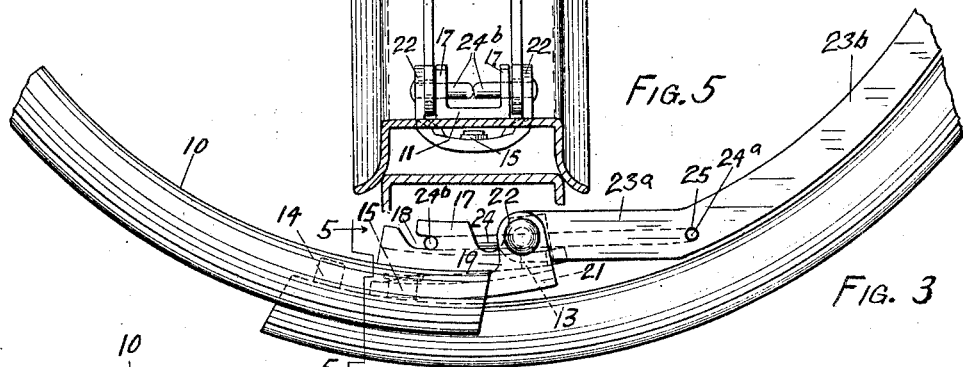
Figure 3 is a side elevation showing the rim fully collapsed by the tool.
Figure 4:
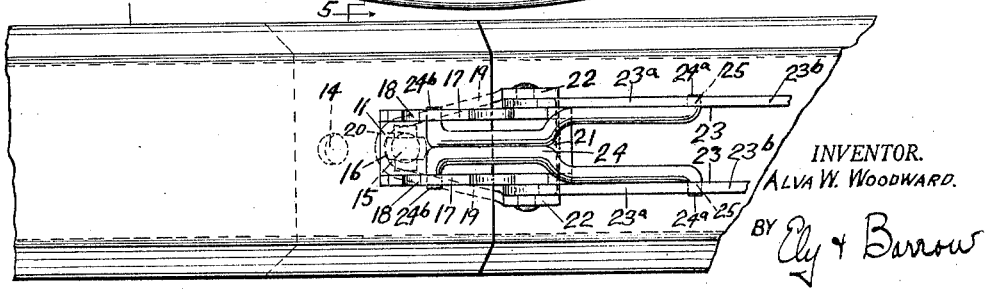
Figure 4 is a plan thereof.

The arrangement of the pivots at 22 and 25 and of the slots 18 is preferably such that in moving lever 23 to the fully collapsed position shown in Figures 3 to 5 with one rim end riding along the other (Figure 5), the bail 24 will be swung from its first position slightly to the other side of the pivots 22 past the dead center line of pivots 22 and extensions 24$^b$ (Figure 3) whereby the stress in the rim serves to hold it collapsed. This action may be accentuated by provision of a somewhat loose connection with bracket 19 on stud 15 whereby the bracket 19 can rock inwardly slightly to insure pivots 22 lying radially inwardly of link 24 as shown in Figure 3. To prevent this upward rocking movement of the bracket 19 up to the end of the collapsing movement, the bracket 19 is formed with flanges providing cam faces 19ª on which the latch carrying end of the rim rides during collapsing movement of the rim in such a way as to permit said rocking only at the end of the collapsing action.

In operation, to contract the rim, the bracket 19 will be engaged on stud 15 and positioned as shown in Figure 1, the free end of bail 24 being engaged in slots 18. Lever 23 will then be swung to the right, acting first to draw that end of rim 10 carrying the latch plate 11 radially inwardly until the latch plate is disengaged from lug 14. Thereafter continued movement of lever 23 draws the latch-carrying end of the rim circumferentially, the stress set up in the rim serving to cause the said latch-carrying end to ride upon the other end of the rim as shown in Figure 5. Movement of lever 23 is continued until it engages the inner periphery of the rim, at which time the bail 24 will have been swung beyond the center of pivots 22, whereby the rim will remain collapsed for mounting or demounting of a tire thereon.

The expanding of the rim is then effected by swinging lever 23 to the left from the position shown in Figure 5 until the aperture in latch plate 11 overlies lug 14, whereupon by forcing the lever downwardly, sufficient thrust may be set up in bail 24 to snap the rim ends back into latched positions.

It is to be noted that only sufficient relatively radial movement of the rim ends is imparted thereto by the tool to unlatch the ends, further relative movement of the rim ends being substantially entirely circumferential. This radial and then circumferential movement is secured by unidirectional movement of the collapsing lever. Accordingly a minimum stress is set up in the rim by the tool to be overcome by the operator which results in easy operation of the tool effectively to collapse the rim. Moreover, since the pivot of the end of the lever does not shift circumferentially toward the split as in prior tools, the collapsing movement of the rim ends may proceed to a greater extent than with prior construction. It will also be noted that the rim ends riding on each other provide a braking action resisting the tendency of the rim to swing lever 23 back to its original position (Figure 1).

Modifications of the invention may be resorted to without departing from the spirit thereof or the scope of the appended claims.

What is claimed is:

1. A transversely split rim collapsing tool including a bracket having a lever pivoted thereon and adapted to be secured to one rim end so as to be capable of slight rocking to shift the pivot of the lever inwardly of the rim, a link on the lever adapted to be connected to the other rim end, and means on the bracket arranged to be engaged by the other rim end to prevent inward shifting of the pivot excepting at the end of the collapsing movement as the link moves from one side of the pivot to the other.

2. A transversely split rim collapsing tool including a bracket having a lever pivoted thereon, means on said bracket whereby it may be secured to one rim end so as to be capable of slight rocking to shift the pivot of the lever inwardly of the rim, and a link on the lever adapted to be connected to the other rim end.

3. A transversely split rim collapsing tool including a bracket having a lever pivoted thereon and adapted to be secured to one rim end so as to be capable of slight rocking to shift the pivot of the lever inwardly of the rim, a link on the lever adapted to be connected to the other rim end, and a cam formed on the bracket on which the other rim end rides during collapsing movement to prevent inward shifting of the pivot until the lever is adjacent the end of its collapsing movement.

ALVA W. WOODWARD.